United States Patent
Jia et al.

(10) Patent No.: US 12,506,576 B2
(45) Date of Patent: Dec. 23, 2025

(54) METHODS AND APPARATUS FOR USING SHORT REFERENCE SYMBOLS WITH A FREQUENCY DOMAIN OFFSET

(71) Applicant: HUAWEI TECHNOLOGIES CO., LTD., Guangdong (CN)

(72) Inventors: Ming Jia, Kanata (CA); Jianglei Ma, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 337 days.

(21) Appl. No.: 18/361,901

(22) Filed: Jul. 30, 2023

(65) Prior Publication Data

US 2023/0379112 A1    Nov. 23, 2023

Related U.S. Application Data

(63) Continuation of application No. PCT/CN2021/077821, filed on Feb. 25, 2021.

(51) Int. Cl.
| | |
|---|---|
| *H04W 4/00* | (2018.01) |
| *H04L 5/00* | (2006.01) |
| *H04L 27/26* | (2006.01) |
| *H04W 72/21* | (2023.01) |
| *H04W 72/23* | (2023.01) |
| *H04W 72/25* | (2023.01) |
| *H04W 72/27* | (2023.01) |

(52) U.S. Cl.
CPC .......... *H04L 5/0048* (2013.01); *H04L 5/0007* (2013.01); *H04L 27/2613* (2013.01); *H04L 27/262* (2013.01); *H04W 72/21* (2023.01); *H04W 72/23* (2023.01); *H04W 72/25* (2023.01); *H04W 72/27* (2023.01)

(58) Field of Classification Search
None
See application file for complete search history.

(56) References Cited

U.S. PATENT DOCUMENTS

| | | | |
|---|---|---|---|
| 11,343,046 B2 * | 5/2022 | Wang | H04W 72/0446 |
| 2018/0049222 A1 * | 2/2018 | Manolakos | H04W 72/1263 |
| 2018/0192321 A1 | 7/2018 | Sahlin et al. | |
| 2019/0342042 A1 * | 11/2019 | Zhang | H04L 5/005 |
| 2019/0349166 A1 * | 11/2019 | Zhang | H04L 27/2613 |

(Continued)

FOREIGN PATENT DOCUMENTS

| | | |
|---|---|---|
| CN | 102224719 A | 10/2011 |
| CN | 105743627 A | 7/2016 |

(Continued)

OTHER PUBLICATIONS

Qualcomm Incorporated, "UL RS Enhancements", 3GPP TSG-RAN WG1 #66, R1-112551, Athens, Greece, Aug. 22-26, 2011, 7 pages.

*Primary Examiner* — Bob A Phunkulh

(57) ABSTRACT

Aspects of the present disclosure provide methods and devices for enabling transmission of a pattern of pilots in a reference signal in which some of the pilot symbols are transmitted on established pilot sub-carriers and other pilot symbols are transmitted offset from the established pilot sub-carriers. This transmission pattern of pilots allows beneficial results such as 1) maintaining a low peak-to-average power ratio (PAPR) in the pilot symbols and 2) reducing resource usage for the pilot symbols as the pilot symbols have a shorter symbol length.

16 Claims, 12 Drawing Sheets

(56) References Cited

U.S. PATENT DOCUMENTS

| | | | | |
|---|---|---|---|---|
| 2021/0258193 A1* | 8/2021 | Li | ................... | H04L 27/26025 |
| 2022/0182160 A1* | 6/2022 | Su | ....................... | H04B 17/309 |
| 2024/0022461 A1* | 1/2024 | Rydback | ............. | H04L 27/2607 |

FOREIGN PATENT DOCUMENTS

| | | |
|---|---|---|
| CN | 106717089 A | 5/2017 |
| WO | 2017035782 A1 | 3/2017 |

* cited by examiner

METHODS AND APPARATUS FOR USING SHORT REFERENCE SYMBOLS WITH A FREQUENCY DOMAIN OFFSET

CROSS-REFERENCE TO RELATED APPLICATIONS

This application is a continuation of International Application No. PCT/CN2021/077821, filed on Feb. 25, 2021, which is hereby incorporated by reference in its entirety.

TECHNICAL FIELD

The present disclosure relates generally to wireless communications, and in particular embodiments, to using a frequency domain offset for a short reference signal.

BACKGROUND

In some wireless communication systems, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are used for performing uplink, downlink and sidelink communications. For example, a base station may wirelessly transmit data, such as a transport block (TB), to a UE in a downlink transmission at a particular frequency and over a particular duration of time. The frequency and time duration used are examples of resources.

As part of the uplink, downlink and sidelink communications, reference signals, also known as pilots, are transmitted by the transmitter, to be used by the receiver, to perform channel estimation. To provide a best possible channel estimation, pilots should be located in a time and frequency transmission resource such that the channel characteristic do not vary significantly between adjacent pilot frequency locations and adjacent pilot time locations. However, to avoid excess overhead, or cause a reduction in data that can be sent, it is desirable not to transmit too many pilots.

Therefore, mechanisms for implementing pilot transmission that balance adequate channel estimation and have a reasonable overhead are beneficial for communication systems.

SUMMARY

Aspects of the present disclosure provide methods and devices for enabling transmission of a pattern of pilots in a reference signal, also known as pilot symbols or reference signal (RS) symbols, in which some of the pilot symbols are transmitted on established pilot sub-carriers and other pilot symbols are offset from the established pilot sub-carriers and where the pilot sub-carriers occur less frequently than data symbols. This transmission pattern of pilot symbols may allow beneficial results such as 1) maintaining a low peak-to-average power ratio (PAPR) in the pilot symbols and 2) reducing resource usage for the pilot symbols as the pilot symbols have a shorter symbol length.

According to an aspect of the application, there is provided a method involving, for a reference signal (RS) mapped to a set of sub-carriers of a RS symbol, wherein a sub-carrier spacing of the RS symbol is $d_p$ times that of a sub-carrier spacing of a data symbol, wherein $d_p$ is an integer value, converting the RS symbol spread over $N_p$ RS sub-carriers into a time domain RS symbol, wherein $N_p$ is an integer value; performing an equivalent of a frequency shift in the frequency domain to the time domain RS symbol; and adding a cyclic prefix (CP) comprising a portion of the time domain RS symbol multiplied by a weighting value of $e^{j2\pi(d_p-1)m/d_p}$ to the time domain RS symbol to generate a RS symbol having a symbol length that is $1/d_p$ the length of a data symbol, wherein $d_p$ is equal to a number of data sub-carriers between RS symbol sub-carriers, and m is a number of sub-carriers of the frequency shift, which is less than $d_p$; and transmitting the RS symbol having the symbol length that is $1/d_p$ the length of the data symbol.

In some embodiments, the converting the RS symbol spread over $N_p$ RS sub-carriers into the time domain RS symbol comprises performing an $N_{FFT}/d_p$ point inverse discrete Fourier transform (IDFT) on the RS symbol to generate the time domain RS symbol, where $N_{FFT}$ is an integer number of points in a Fast Fourier transform being performed on the data symbol.

In some embodiments, the performing the equivalent of the frequency shift in the frequency domain to the time domain RS symbol comprises multiplying the time domain RS symbol by $e^{j2\pi nm/N_{FFT}}$, n=0 to $N_{FFT}/d_p-1$, where $N_{FFT}$ is an integer number of points in a Fast Fourier transform performed on the data symbol.

In some embodiments, the method further involves transmitting configuration information that comprises one or more of: sub-carrier spacing of the RS symbol; CP length; a number of antenna ports sharing a same RS symbol; RS symbol pattern information comprising: for at least one symbol, the value of m; and a repetition pattern of symbols.

In some embodiments, the configuration information is transmitted in at least one of: radio resource control (RRC) messaging; downlink control information (DCI); uplink control information (UCI); or sidelink control information (SCI).

In some embodiments, the method is performed by: a base station for downlink (DL) communication; a base station for backhaul communication; a user equipment for uplink (UL) communication; or a user equipment for sidelink (SL) communication.

According to an aspect of the application, there is provided an apparatus that includes a processor and a computer-readable medium having stored thereon computer executable instructions. The computer executable instructions, when executed by the processor, cause the apparatus to: for a reference signal (RS) mapped to a set of sub-carriers of a RS symbol, wherein a sub-carrier spacing of the RS symbol is $d_p$ times that of a sub-carrier spacing of a data symbol, wherein $d_p$ is an integer value, convert the RS symbol spread over $N_p$ RS sub-carriers into a time domain RS symbol, wherein $N_p$ is an integer value; perform an equivalent of a frequency shift in the frequency domain to the time domain RS symbol; and add a cyclic prefix (CP) comprising a portion of the time domain RS symbol multiplied by a weighting value of $e^{j2\pi(d_p-1)m/d_p}$ to the time domain RS symbol to generate a RS symbol having a symbol length that is $1/d_p$ the length of a data symbol, wherein $d_p$ is equal to a number of data sub-carriers between RS symbol sub-carriers, and m is a number of sub-carriers of the frequency shift, which is less than $d_p$; and transmit the RS symbol having the symbol length that is $1/d_p$ the length of the data symbol.

In some embodiments, the computer executable instructions that convert the RS symbol spread over $N_p$ RS sub-carriers into the time domain RS symbol comprise computer executable instructions that when executed perform an $N_{FFT}/d_p$ point IDFT on the RS symbol sequence of $N_p$ elements to generate the time domain of the RS symbol, where $N_{FFT}$ is an integer number of points in a Fast Fourier transform being performed on the data symbol.

In some embodiments, the computer executable instructions that perform the equivalent of a frequency shift in the frequency domain to the time domain RS symbol comprise computer executable instructions that when executed multiply the time domain RS symbol by $e^{j2\pi nm/N_{FFT}}$, n=0 to $N_{FFT}/d_p-1$, where $N_{FFT}$ is an integer number of points in a Fast Fourier transform performed on the data symbol.

In some embodiments, the computer executable instructions, when executed by the processor, cause the apparatus to transmit configuration information that comprise one or more of: sub-carrier spacing of the RS symbol; a number of antenna ports sharing a same RS symbol; CP length; RS symbol pattern information comprising: for at least one symbol, the value of m; and a repetition pattern of symbols.

In some embodiments, the apparatus is: a base station for downlink (DL) communication; a base station for backhaul communication; a user equipment for uplink (UL) communication; or a user equipment for sidelink (SL) communication.

According to an aspect of the application, there is provided a method involving: receiving a reference signal (RS) symbol having a symbol length that is $1/d_p$ the length of a data symbol, wherein $d_p$ is an integer value; removing a cyclic prefix (CP) from the received RS symbol; replicating the received RS symbol, without the CP, $d_p-1$ times and multiplying each of the $d_p-1$ replicated RS symbols by a corresponding weighting value of $e^{j2\pi nm/d_p}$, n=0 to $d_p-1$, to generate a time domain RS symbol equal in length to a data symbol, $d_p$ is equal to a number of data sub-carriers between RS elements and m is less than $d_p$; converting the time domain RS symbol to a frequency domain sequence of $N_p$ elements in which the $N_p$ elements occur spaced apart by $d_p$ data sub-carriers; performing channel estimation for the location of the $N_p$ elements.

In some embodiments, converting the time domain RS symbol to the frequency domain sequence of $N_p$ elements comprises performing a $N_{FFT}$ point DFT on the time domain RS symbol to generate the frequency domain sequence of $N_p$ elements, where $N_{FFT}$ is an integer number of points in a Fast Fourier transform performed on the data symbol.

In some embodiments, the method further involves receiving configuration information that includes one or more of: sub-carrier spacing of the RS symbol; CP length; a number of antenna ports sharing a same RS symbol; RS symbol pattern information comprising: for at least one symbol, the value of m; and a repetition pattern of symbols.

In some embodiments, the method of performed by: a base station for uplink (UL) communication; a base station for backhaul communication; a user equipment for downlink (DL) communication; or a user equipment for sidelink (SL) communication.

In some embodiments, the configuration information is received in at least one of: radio resource control (RRC) messaging; downlink control information (DCI); uplink control information (UCI); or sidelink control information (SCI).

According to an aspect of the application, there is provided a method involving: receiving a reference signal (RS) symbol having a symbol length that is $1/d_p$ the length of a data symbol, wherein $d_p$ is an integer value; removing a cyclic prefix (CP) from the received RS symbol; without the CP, multiplying the RS symbol by $e^{j2\pi nm/N_{FFT}}$, n=0 to $N_{FFT}/d_p-1$, to generate a time domain shifted RS symbol, where $d_p$ is equal to a number of data sub-carriers between RS symbol elements on the RS sub-carrier grid, m is a number less than $d_p$, and $N_{FFT}$ is the number of points in a fast Fourier transform (FFT) performed on the data symbol; converting the time domain shifted RS symbol to a frequency domain sequence of $N_p$ elements in which the $N_p$ elements occur spaced apart by $d_p$ data sub-carriers; and performing channel estimation for the location of the $N_p$ elements.

In some embodiments, converting the time domain shifted RS to the frequency domain sequence of $N_p$ elements comprises performing an $N_{FFT}/d_p$ point DFT on the time domain shift RS symbol to generate the frequency domain sequence of $N_p$ elements.

In some embodiments, the method further involves receiving configuration information that includes one or more of: sub-carrier spacing of the RS symbol; CP length; a number of antenna ports sharing a same RS symbol; RS symbol pattern information including: for at least one symbol, the value of m; and a repetition pattern of symbols.

In some embodiments, the method of performed by: a base station for uplink (UL) communication; a base station for backhaul communication; a user equipment for downlink (DL) communication; or a user equipment for sidelink (SL) communication.

In some embodiments, the configuration information is received in at least one of: radio resource control (RRC) messaging; downlink control information (DCI); uplink control information (UCI); or sidelink control information (SCI).

According to an aspect of the application, there is provided an apparatus that includes a processor and a computer-readable medium having stored thereon computer executable instructions. The computer executable instructions, when executed by the processor, cause the apparatus to perform a method as described above for receiving a RS symbol.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
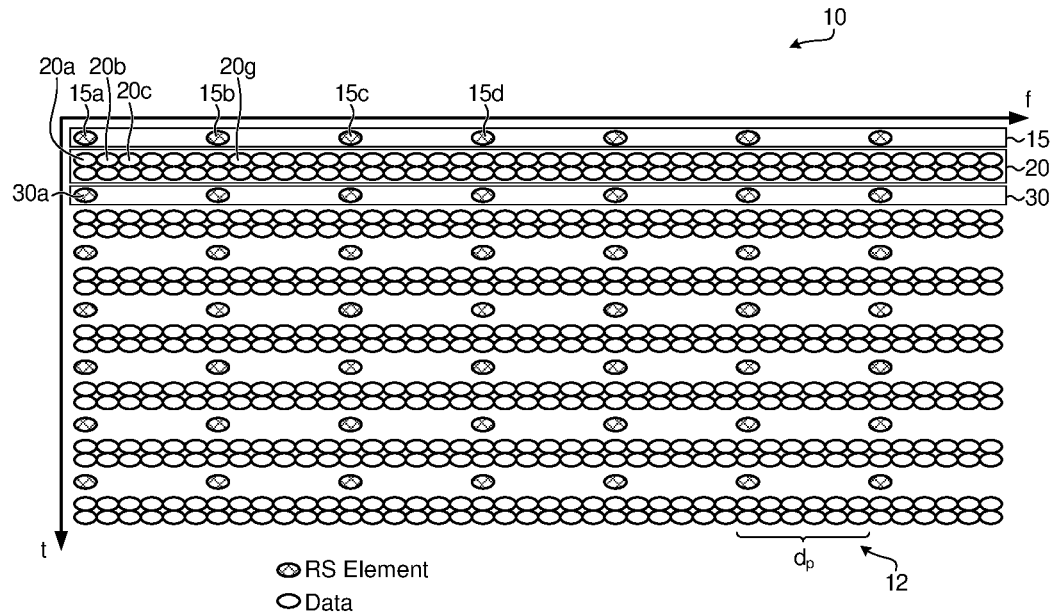
FIG. 1 is a schematic diagram of a time and frequency resource having a reference signal (RS) sub-carrier spacing different than that of a data sub-carrier spacing for a short reference signal.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

In order to achieve low peak-to-average power ratio (PAPR), reference signals (RSs) are usually not mixed with data. In other words, usually one orthogonal frequency domain multiplexed (OFDM) symbol (or a variant symbol, such as a discrete Fourier transform spread OFDM (DFT-S-OFDM) symbol) is transmitted as a RS. Due to the property of coherence bandwidth, which is a signal being relatively consistent over a given frequency range, reference signals are not necessarily sent on a sub-carrier set that correspond to a data sub-carrier set. It may be considered that there is a first sub-carrier set for RS and a different second sub-carrier set for data. In such a scenario, the RS sub-carrier set may have a periodicity that is the inverse of the spacing of the data sub-carrier $d_p$, or in other words, there are $d_p$ data sub-carriers between RS sub-carriers. When this is the case, the duration of a RS symbol is reduced to the $1/d_p$ of a data symbol, and thus more resources can be saved for data transmission or for more frequent RS transmission to combat high Doppler.

FIG. 1 shows a conventional pattern 10 for short length RS symbols within a time and frequency resource. The time and frequency resource shown in FIG. 1 is a resource block in which time (t) is shown on the vertical axis and frequency (f) is shown on the horizontal axis. A RS symbol can be considered a set of RS elements at multiple frequencies at a given time. For example, RS 15 is made up of multiple reference signal elements 15a, 15b, 15c, and 15d.

Data can be seen in a block 20 of the time and frequency resource, where each data element 20a, 20b, 20c is transmitted on a data sub-carrier.

The RS elements in the time and frequency resource are evenly distributed in the shape of rectangular gird. Each RS element is located on a RS sub-carrier. The location of RS sub-carriers are common for all RS symbols. In FIG. 1, in a first RS symbol 15, a first RS symbol sub-carrier 15a aligns with a first data sub-carrier 20a. In a second RS symbol 30, a first RS symbol sub-carrier 30a aligns with the first data sub-carrier 20a. The spacing between RS sub-carriers, expressed in the number of data sub-carriers $d_p$ 12, is six data sub-carriers in FIG. 1, so the second RS symbol element, i.e. RS symbol element 15b, aligns with the seventh data sub-carrier, i.e. data symbol element 20g.

As long as the coherence bandwidth is larger than the horizontal interval and the coherence time is smaller than the vertical interval, the channel can be accurately estimated, if no noise or interference is considered. This design provided two beneficial results, namely 1) low PAPR in RS symbols and 2) reduced resource usage of RS symbols (due to shorter symbol length).

Aspects of the present disclosure provide a methodology for providing the equivalent of frequency shift of short reference signals so as to allow higher density of RS elements in the frequency direction than the example of FIG.

1 of a time and frequency resource, while still maintaining low PAPR in RS symbols and reduced resource usage of RS symbols. This methodology has the flexibility of improving channel estimation performance, based on channel selectivity in the time and frequency directions.

FIGS. 2A, 2B, 3A, and 3B following below provide context for the network and devices that may be in the network and that may implement aspects of the present disclosure.

Figure 2A:
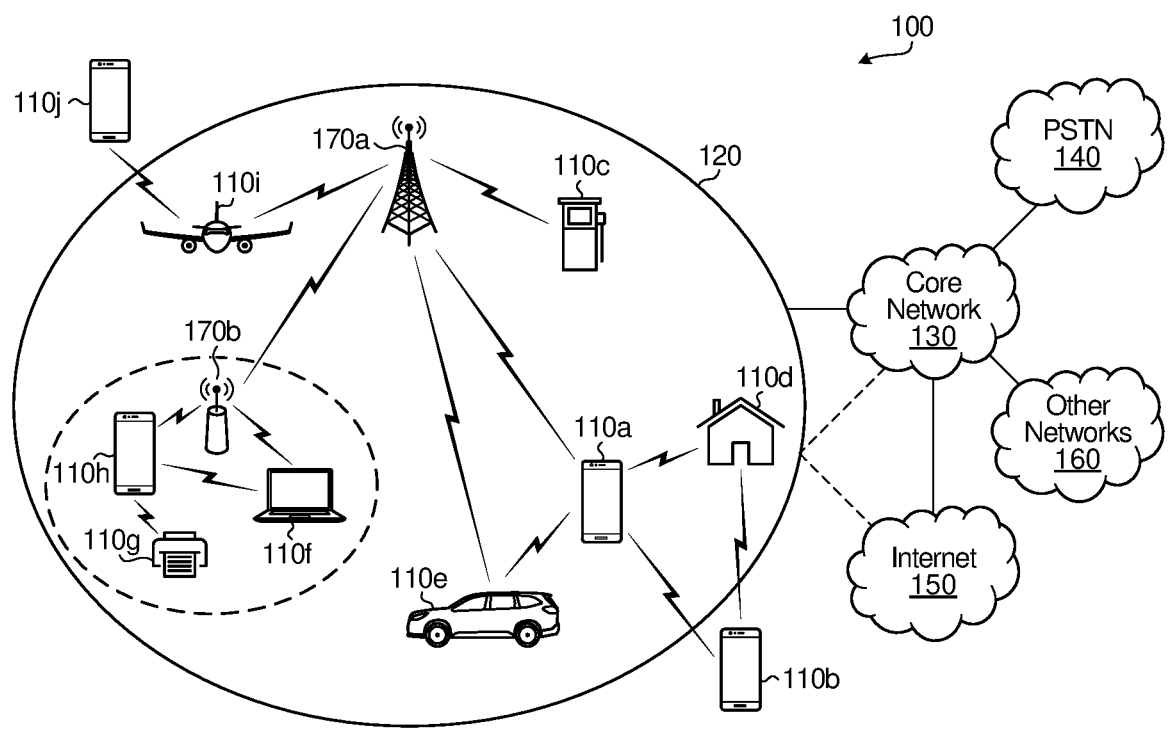
FIG. 2A is a schematic diagram of a communication system in which embodiments of the disclosure may occur.

Referring to FIG. 2A, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-120j (generically referred to as 110) may be interconnected to one another, and may also or instead be connected to one or more network nodes (170a, 170b, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2B:
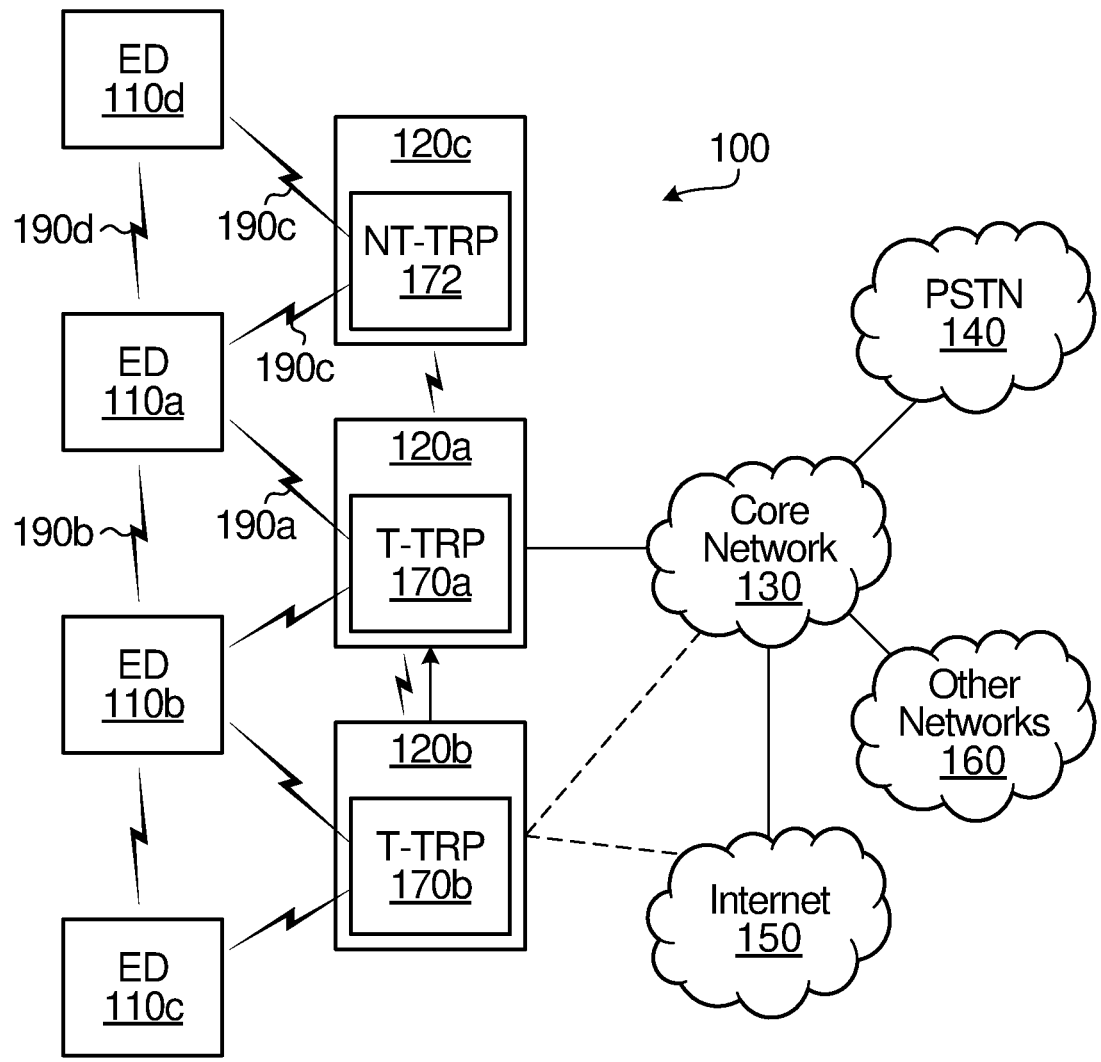
FIG. 2B is another schematic diagram of a communication system in which embodiments of the disclosure may occur.

FIG. 2B illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered subsystems of the communication system. In the example shown, the communication system 100 includes electronic devices (ED) 110a-110d (generically referred to as ED 110), radio access networks (RANs) 120a-120b, non-terrestrial communication network 120c, a core network 130, a public switched telephone network (PSTN) 140, the internet 150, and other networks 160. The RANs 120a-120b include respective base stations (BSs) 170a-170b, which may be generically referred to as terrestrial transmit and receive points (T-TRPs) 170a-170b. The non-terrestrial communication network 120c includes an access node 120c, which may be generically referred to as a non-terrestrial transmit and receive point (NT-TRP) 172.

Any ED 110 may be alternatively or additionally configured to interface, access, or communicate with any other T-TRP 170a-170b and NT-TRP 172, the internet 150, the core network 130, the PSTN 140, the other networks 160, or any combination of the preceding. In some examples, ED 110a may communicate an uplink and/or downlink transmission over an interface 190a with T-TRP 170a. In some examples, the EDs 110a, 110b and 110d may also communicate directly with one another via one or more sidelink air interfaces 190b. In some examples, ED 110d may communicate an uplink and/or downlink transmission over an interface 190c with NT-TRP 172.

The air interfaces 190a and 190b may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190a and 190b. The air interfaces 190a and 190b may utilize other higher dimension signal spaces, which may involve a combination of orthogonal and/or non-orthogonal dimensions.

The air interface 190c can enable communication between the ED 110d and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120a and 120b are in communication with the core network 130 to provide the EDs 110a 110b, and 110c with various services such as voice, data, and other services. The RANs 120a and 120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a and 120b or EDs 110a 110b, and 110c or both, and (ii) other networks (such as the PSTN 140, the internet 150, and the other networks 160). In addition, some or all of the EDs 110a 110b, and 110c may include functionality for communicating with different wireless networks over different wireless links using different wireless technologies and/or protocols. Instead of wireless communication (or in addition thereto), the EDs 110a 110b, and 110c may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110a 110b, and 110c may be multimode devices capable of operation according to multiple radio access technologies, and incorporate multiple transceivers necessary to support such technologies.

Figure 3A:
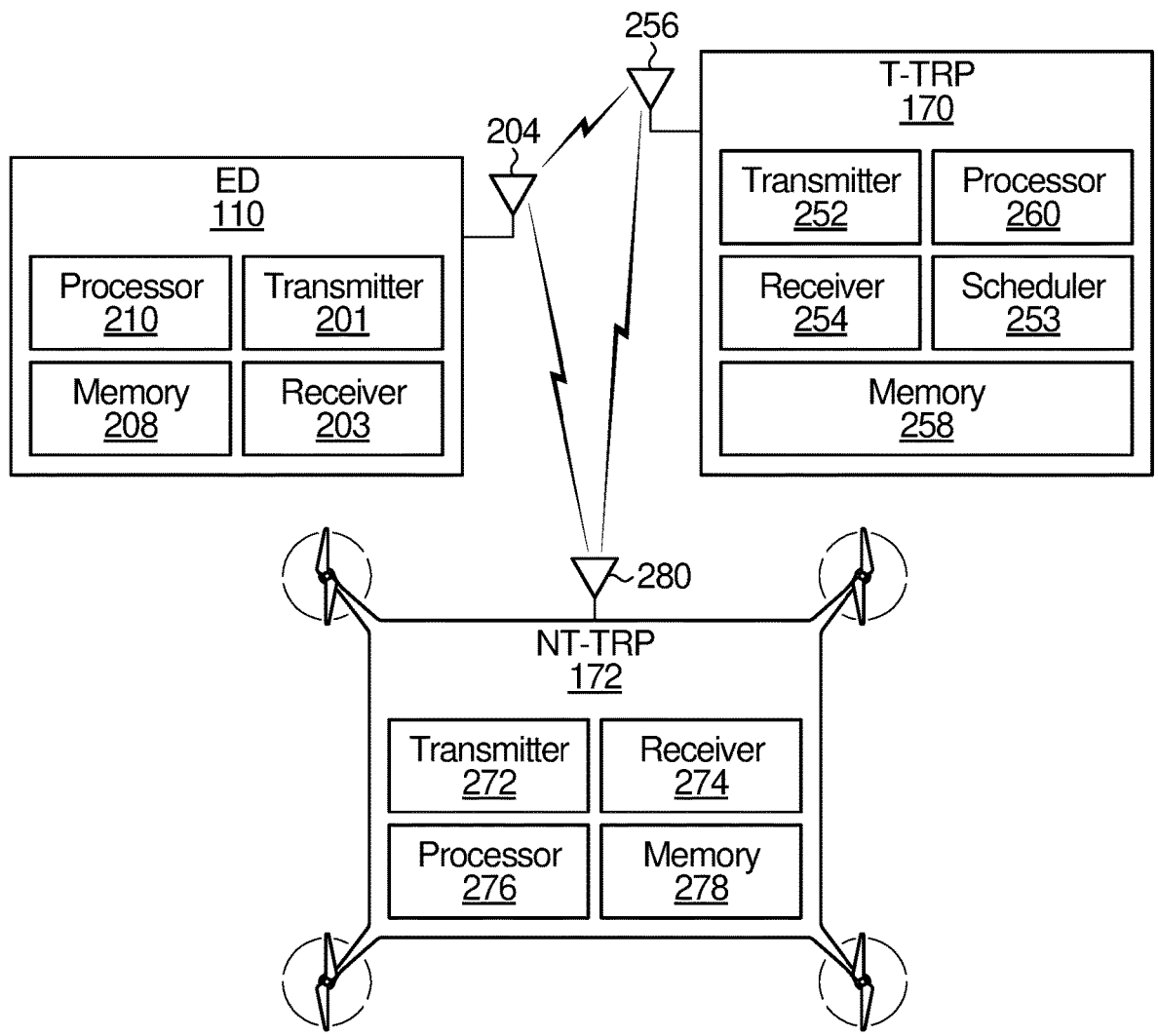
FIG. 3A is block diagram illustrating example electronic devices and network devices.

FIG. 3A illustrates another example of an ED 110 and network devices, including a base station 170a, 170b (at 170) and an NT-TRP 172. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170*a* and 170*b* is a T-TRP and will hereafter be referred to as T-TRP 170. Also shown in FIG. 3A, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 2A). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 210 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distributed unit (DU), positioning node, among other possibilities. The T-TRP 170 may be macro BSs, pico BSs, relay node, donor node, or the like, or combinations thereof. The T-TRP 170 may refer to the forging devices, or to apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. multiple-input multiple-output (MIMO) precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 3B:
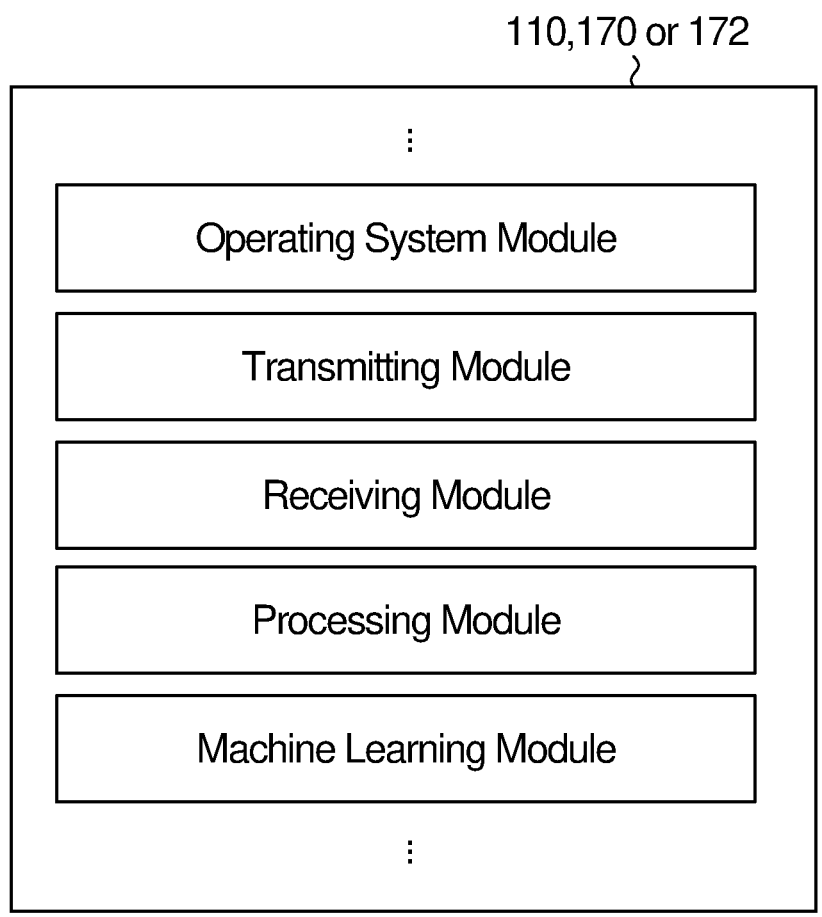
FIG. 3B is a block diagram illustrating units or modules in a device.

One or more steps of the embodiment methods provided herein may be performed by corresponding units or modules, according to FIG. 3B. FIG. 3B illustrates units or modules in a device, such as in ED 110, in T-TRP 170, or in NT-TRP 172. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

Going to the future wireless network, the number of the new devices could be increased exponentially with diverse functionalities. Also, a lot more new applications and use cases than 5G may emerge with more diverse quality of service demands. These will result in new key performance indications (KPIs) for the future wireless network (for an example, 6G network) that can be extremely challenging, so the sensing technologies, and AI technologies, especially ML (deep learning) technologies, had been introduced to telecommunication for improving the system performance and efficiency.

AI/ML technologies applied communication including AI/ML communication in Physical layer and AI/ML communication in media access control (MAC) layer. For physical layer, the AI/ML communication may be useful to optimize the components design and improve the algorithm performance, like AI/ML on channel coding, channel modelling, channel estimation, channel decoding, modulation, demodulation, MIMO, waveform, multiple access, PHY element parameter optimization and update, beam forming & tracking and sensing & positioning, etc. For MAC layer, AI/ML communication may utilize the AI/ML capability with learning, prediction and make decisions to solve the complicated optimization problems with better strategy and optimal solution, for example to optimize the functionality in MAC, e.g. intelligent TRP management, intelligent beam management, intelligent channel resource allocation, intelligent power control, intelligent spectrum utilization, intelligent MCS, intelligent hybrid automatic repeat request (HARQ) strategy, intelligent transmit/receive (Tx/Rx) mode adaption, etc.

AI/ML architectures usually involve multiple nodes, which can be organized in two modes, i.e., centralized and distributed, both of which can be deployed in access network, core network, or an edge computing system or third-party network. The centralized training and computing architecture is restricted by huge communication overhead and strict user data privacy. Distributed training and computing architecture comprises several framework, e.g., distributed machine learning and federated learning. AI/ML architectures comprises intelligent controller which can perform as single agent or multi-agent, based on joint optimization or individual optimization. New protocol and signaling mechanism is needed so that the corresponding interface link can be personalized with customized parameters to meet particular requirements while minimizing signaling overhead and maximizing the whole system spectrum efficiency by personalized AI technologies.

Further terrestrial and non-terrestrial networks can enable a new range of services and applications such as earth monitoring, remote sensing, passive sensing and positioning, navigation, and tracking, autonomous delivery and mobility. Terrestrial networks based sensing and non-terrestrial networks based sensing could provide intelligent context-aware networks to enhance the UE experience. For example, terrestrial networks based sensing and non-terrestrial networks based sensing may involve opportunities for localization and sensing applications based on a new set of features and service capabilities. Applications such as THz imaging and spectroscopy have the potential to provide continuous, real-time physiological information via dynamic, non-invasive, contactless measurements for future digital health technologies. Simultaneous localization and mapping (SLAM) methods will not only enable advanced cross reality (XR) applications but also enhance the navigation of autonomous objects such as vehicles and drones. Further in terrestrial and non-terrestrial networks, the measured channel data and sensing and positioning data can be obtained by the large bandwidth, new spectrum, dense network and more light-of-sight (LOS) links. Based on these data, a radio environmental map can be drawn through AI/ML methods, where channel information is linked to its corresponding positioning or environmental information to provide an enhanced physical layer design based on this map.

Sensing coordinators are nodes in a network that can assist in the sensing operation. These nodes can be stand-alone nodes dedicated to just sensing operations or other nodes (for example TRP 170, ED 110, or core network node) doing the sensing operations in parallel with communication transmissions. A new protocol and signaling mechanism is needed so that the corresponding interface link can be performed with customized parameters to meet particular requirements while minimizing signaling overhead and maximizing the whole system spectrum efficiency.

AI/ML and sensing methods are data-hungry. In order to involve AI/ML and sensing in wireless communications, more and more data are needed to be collected, stored, and exchanged. The characteristics of wireless data expand quite large ranges in multiple dimensions, e.g., from sub-6 GHz, millimeter to Terahertz carrier frequency, from space, outdoor to indoor scenario, and from text, voice to video. These data collecting, processing and usage operations are performed in a unified framework or a different framework.

Figure 4:
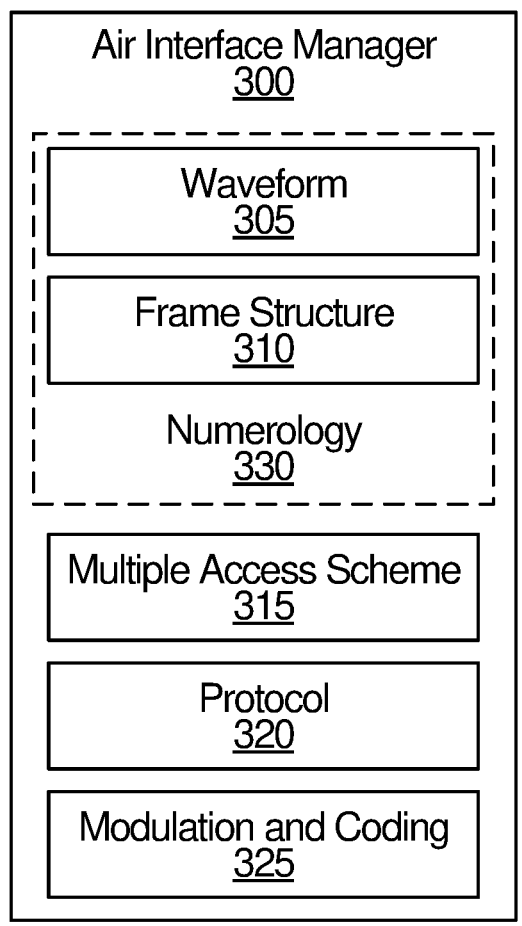
FIG. 4 is a block diagram of an air interface manager for configuring a software-configurable air interface according to an aspect of the present disclosure.

FIG. 4 illustrates a schematic diagram of an air interface manager 300 for configuring a software-configurable air interface 190. The air interface manager 300 may be, for example, a module including a number of components or building blocks that define the parameters of the air interface 190 and collectively specify how a transmission is to be made and/or received by the air interface 190. The air interface manger 300 could also or instead define the parameters of the SL air interface 180 and collectively specify how a transmission is to be made and/or received by the SL air interface 180.

The components of the air interface manger 300 include at least one of a waveform component 305, a frame structure component 310, a multiple access scheme component 315, a protocol component 320, and a modulation and coding component 325.

The waveform component 305 may specify a shape and form of a signal being transmitted. Waveform options may include orthogonal multiple access waveforms and non-orthogonal multiple access waveforms. Non-limiting examples of such waveform options include Single-Carrier (SC), Ultra-Wideband (UWB), Frequency Modulated Continuous Wave (FMCW), Linear Frequency Modulated (LFM), Orthogonal Frequency Division Multiplexing (OFDM), Single-Carrier Frequency Division Multiple Access (SC-FDMA), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, low Peak to Average Power Ratio Waveform (low PAPR WF), Discrete Fourier Transform-spread-Orthogonal Frequency Domain Modulation (DFT-s-OFDM) and single carrier Offset Quadrature Amplitude Modulation (OQAM). In some embodiments, a combination of waveform options is possible.

The frame structure component 310 may specify a configuration of a frame or group of frames. The frame structure component 310 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval (TTI) or a transmission time unit (TTU). The frame structure component may also specify whether the time slot is a configurable multi-level TTI, a fixed TTI, or a configurable single-level TTI. The frame structure component may further specify a co-existence mechanism for different frame structure configurations.

For some waveforms, such as certain OFDM-based waveforms, the frame structure component may also specify one or more associated waveform parameters, such as sub-carrier width, symbol duration, cyclic prefix (CP) length, channel bandwidth, guard bands/sub-carriers, locations of reference signals, reference signal length, and sampling size and frequency.

Additionally, the frame structure component 310 may further specify whether the frame structure is used in a time-division duplex communication or a frequency-division duplex communication.

Additionally, the frame structure component 310 may further specify the transmission state and/or direction for each symbol in a frame. For example, each symbol may independently be configured as a downlink symbol, an uplink symbol, or a flexible symbol.

Together, the specifications of the waveform component and the frame structure component are sometimes known as the "numerology." Thus, the air interface 190 may include a numerology component 330 defining a number of air interface configuration parameters, such as the sub-carrier spacing, CP length, symbol length, slot length, and symbols per slot.

These numerologies, also known as sub-carrier spacing configurations, may be scalable in the sense that sub-carrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using one or a combination of scalable numerologies. For example, a numerology with 60 kHz sub-carrier spacing has a relatively short OFDM symbol duration (because OFDM symbol duration varies inversely with sub-carrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz sub-carrier spacing. A numerology with 15 kHz sub-carrier spacing may be compatible with LTE. A numerology with 15 kHz sub-carrier spacing may serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or become apparent to persons of ordinary skill in the art. Of the four numerologies listed, those with 30 kHz and 60 kHz sub-carrier spacings are more robust to Doppler spreading (fast moving conditions), because of the wider sub-carrier spacing. It is further contemplated that different numerologies may use different values for other physical layer parameters, such as the same sub-carrier spacing and different cyclic prefix lengths. In addition, sub-carrier spacing may depend on the operational frequency band. For example, the sub-carrier spacing in millimeter wave frequencies may be higher than in lower frequencies.

It is further contemplated that other sub-carrier spacings may be used, such as higher or lower sub-carrier spacings. For example, other sub-carrier spacings varying by a factor of $2^n$ include 120 kHz and 3.75 kHz. Furthermore, reference signal sub-carrier spacing may be different that data sub-carrier spacing. In some embodiments, the reference signal sub-carrier spacing is larger than the data sub-carrier spacing, for example as shown by reference signal sub-carrier spacing between 15a and 15b in FIG. 1 as compared to data sub-carrier spacing between 20a and 20b in FIG. 1.

In other examples, a more limited scalability may be implemented, in which two or more numerologies all have sub-carrier spacings that are integer multiples of the smallest sub-carrier spacing, without necessarily being related by a factor of $2^n$, where n is an integer value. Examples include 15 kHz, 30 kHz, 45 kHz, 60 kHz sub-carrier spacings.

In still other examples, non-scalable sub-carrier spacings may be used, which are not all integer multiples of the smallest sub-carrier spacing, such as 15 kHz, 20 kHz, 30 kHz, and 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different sub-carrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipment (UEs).

The use of different numerologies can allow the air interface 190 to support coexistence of a diverse set of use cases having a wide range of quality of service (QoS) requirements, such as different levels of latency or reliability tolerance, as well as different bandwidth or signaling overhead requirements. In one example, the base station can signal to the ED an index representing a selected numerology, or a single parameter (e.g., sub-carrier spacing) of the selected numerology. Based on this signaling, the ED may determine the parameters of the selected numerology from other information, such as a look-up table of candidate numerologies stored in memory.

Continuing with the components of the air interface 190, the multiple access scheme component 315 may specify how access to a channel is granted for one or more EDs. Non-limiting examples of multiple access technique options include technologies defining how EDs share a common physical channel, such as: Time Division Multiple Access (TDMA), Frequency Division Multiple Access (FDMA), Code Division Multiple Access (CDMA), Space Division Multiple Access (SDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, the multiple access technique options may include scheduled access, non-scheduled access, also known as grant-free access or configured grant, contention-based shared channel resource, non-contention-based shared channel resource, and cognitive radio-based access.

The protocol component 320 may specify how a transmission and/or a re-transmission are to be made. Non-limiting examples of transmission and/or re-transmission mechanism options include those that specify a scheduled data pipe size and a signaling mechanism for transmission and/or re-transmission.

The modulation and coding component 325 may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to Quadrature Amplitude Modulation (QAM) specified by a complex constellation (including, for example, the modulation technique and order, e.g. 16QAM, 64QAM, 256QAM etc.), or more specifically to various types of advanced modulation methods such as hierarchical modulation, multi-dimensional modulation and low Peak-to-Average Power Ratio (PAPR) modulation.

Because an air interface includes a plurality of components or building blocks, and each component may have a plurality of candidate technologies (also referred to herein as air interface capability options), the air interface manager 300 may configure and store a large number of different air interface profiles. Each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 300 and used for communications between the pair of communicating transmitting-receiving devices.

In further embodiments, the air interface manager 300 may modify or update its components, profiles, or capability options. For example, the air interface manager 300 may replace the waveform and frame structure components 305, 310, with a single numerology component 330. Conversely, the air interface manager 300 may separate the modulation and coding component 325 into an individual coding component and an individual modulation component. Furthermore, the air interface manager 300 is configurable such that new soft air interface configuration components developed in the future should be able to be utilized.

The air interface manager 300 may also update certain components to modify the capability options of any given component. For example, the air interface manager 300 may update the modulation and coding component 325 to include higher-order modulation schemes.

By updating the stored components, profiles, and candidate options, the air interface manager 300 can flexibly adapt to better accommodate diverse wireless traffic types and services. Modifying or updating components, profiles, and candidate options may allow the air interface manager 300 to provide suitable air interface profiles for traffic types or services other than those already contemplated for ultra-reliable low latency communications (URLLC), enhanced mobile broadband (eMBB), and massive machine-type communications (mMTC).

Figure 5:
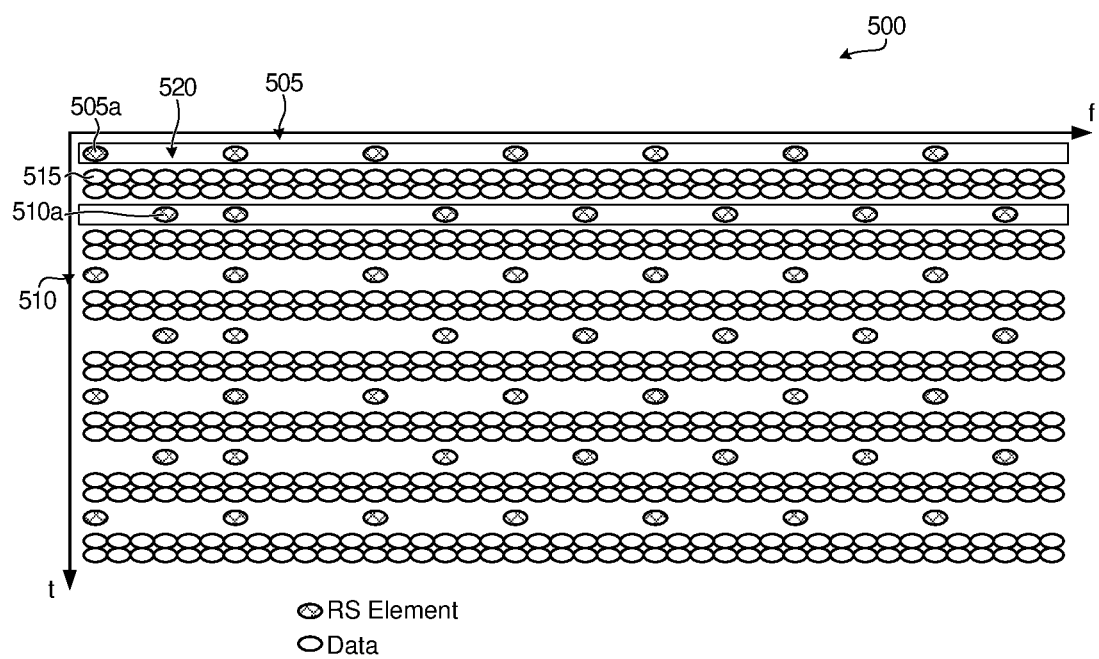
FIG. 5 is a schematic diagram of a time and frequency resource having a reference signal (RS) sub-carrier spacing different than that of a data sub-carrier spacing and where the locations of RS symbol elements in adjacent RS symbols are offset from one another according to an embodiment of the present disclosure.

Previously described FIG. 1 illustrates an example of a grid of reference signal elements for which the elements have a common RS sub-carrier for all RS symbols. FIG. 5 illustrates a pattern 500 for which the RS symbol elements of consecutive RS symbols are not located on a common RS sub-carrier. The time and frequency resource shown in FIG. 5 is a resource block in which time (t) is shown on the vertical axis and frequency (f) is shown on the horizontal axis. Referring to FIG. 5, in a first RS symbol 505, a first RS symbol sub-carrier 505a aligns with a first data sub-carrier 515. In a second RS symbol 510, a first RS symbol sub-carrier 510a aligns with a fourth data sub-carrier 520. There is an offset between the location of the RS sub-carriers that can be expressed by a number of data sub-carriers as there are multiple data sub-carriers between the RS sub-carriers. This pattern has the flexibility of improving channel estimation performance, based on channel selectivity in the time and frequency directions. For example, for slow-mobility users, this pattern equivalently doubles the pilot density in the frequency direction, which can be used to improve channel estimation of highly frequency selective channels.

As discussed above, a short RS symbol has a length of the $1/d_p$ of a data symbol, as its sub-carrier spacing is $d_p$ times that of a data symbol sub-carrier spacing. To transmit a RS symbol with frequency direction offset, it is desirable to maintain the same short symbol length. However, since the offset is substantially equivalent to a m/M sub-carrier shift, where m is a number of data sub-carriers of the shift as compared to a reference signal symbol that is not shifted relative to the total number of M data sub-carriers, the signal configuration is different. In some embodiments, the value of M is equal to the value of the $d_p$ data sub-carriers between RS elements in the RS symbol. As the frequency shift results in the RS elements shift to a location between existing RS sub-carriers, the locations of the shifted RS short symbol elements occur at what may be considered "virtual" sub-carriers as there is no actual RS sub-carrier at that location.

While FIG. 5 illustrates the first RS symbol 505 having a first RS sub-carrier 505a aligned with a first data sub-carrier 515 and the second RS symbol 510 offset from the existing RS sub-carrier arrangement, in other embodiments, a first symbol RS symbol may be offset from the existing RS sub-carrier arrangement and the second symbol RS symbol may be aligned with the existing RS sub-carrier arrangement.

In some embodiments, there may be multiple different RS symbol offsets with respect to the existing RS sub-carrier arrangement. For example, if there are two different offset values, a first offset is substantially equivalent to a $m_1/M$ sub-carrier shift, where $m_1$ is a first number of data sub-carriers of the shift as compared to a reference signal symbol that is not shifted relative to the total number of M data sub-carriers and a second offset is substantially equivalent to a $m_2/M$ sub-carrier shift, where $m_2$ is a second number of data sub-carriers of the shift as compared to a reference signal symbol that is not shifted relative to the total number of M data sub-carriers. These different offset values may be used in various arrangements, for example for a first RS symbol in the time direction the RS symbol elements are aligned with the RS sub-carriers, for a second RS symbol in the time direction the RS symbol elements have the first offset that is substantially equivalent to a $m_1/M$ sub-carrier shift, for a third RS symbol in the time direction the RS symbol elements are aligned with the RS sub-carriers, for a fourth RS symbol in the time direction the RS symbol elements have the second offset that is substantially equivalent to a $m_2/M$ sub-carrier shift. This arrangement of RS symbols can be repeated over the RS symbols in the time and frequency resource. While this is one example, different arrangements of offsets of RS symbol element locations are considered to be possible.

In some embodiments, different antenna ports may be assigned different RS symbol patterns. In some embodiments, different TRPs can be assigned different RS symbol patterns. In some embodiments, different UEs can be assigned different RS symbol patterns.

A RS symbol sequence that is aligned with existing RS sub-carriers can be expressed in the frequency domain as $X(k)$, $k=0, 1, \ldots, N_p-1$, where $N_p$ is an integer value. Converting the frequency domain RS symbol sequence into a time domain RS sequence can be performed by using a $N_{FFT}/d_p$-point IDFT, resulting in the form $x(n)$, $n=0, 1, \ldots, N_{FFT}/d_p-1$, where $N_{FFT}$ is the system DFT/IDFT size. In comparison to the RS symbol sequence aligned with existing RS sub-carriers, a RS symbol sequence offset from the existing RS sub-carriers needs to be shifted to the right (or left) by m/M sub-carrier space, where m is equivalent to a shift expressed in a number of data sub-carriers and M is the number of data sub-carriers between adjacent RS sub-carriers. This can be performed effectively in the time domain by using the relationship:

$$\tilde{x}(n) = x(n) e^{j2\pi mnd_p/MN_{FFT}} \qquad (1)$$

where $\tilde{x}(n)$ is an offset RS symbol, $x(n)$ is a RS symbol sequence aligned with existing RS sub-carriers, and $e^{j2\pi mnd/MN_{FFT}}$ is a weighting factor that is equivalent to the offset in the time domain.

A RS symbol sequence $X(k)$ aligned with existing RS sub-carriers is shifted to the right by an amount equal to m/M of the RS sub-carrier spacing. Since the RS symbol sequence when offset from the existing RS sub-carriers does not occur on the original RS sub-carriers, to observe the offset RS symbol sequence the sub-carrier resolution can be increased, for example by reducing the sub-carrier spacing by 1/M times.

Figure 6A:
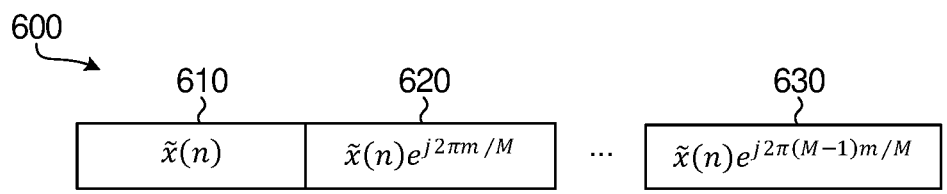
FIG. 6A is a schematic diagram of a RS symbol according to an embodiment of the present disclosure.

FIG. 6A illustrates a time domain sequence 600 that includes M portions 610, 620, 630, each having a length $N_{FFT}/d_p$. Performing a discrete Fourier transform (DFT) on the time domain sequence, the original pilot sequence $X(k)$ occurs on sub-carrier indexes k'=m, M+m, ..., $(N_p-1)M+m$. Because the sub-carrier space is reduced by 1/M times and in conjunction with equation (1) above, the RS element sequence $X(k)$ is offset with respect to the existing RS sub-carriers by m/M of the RS sub-carrier spacing.

Figure 6B:
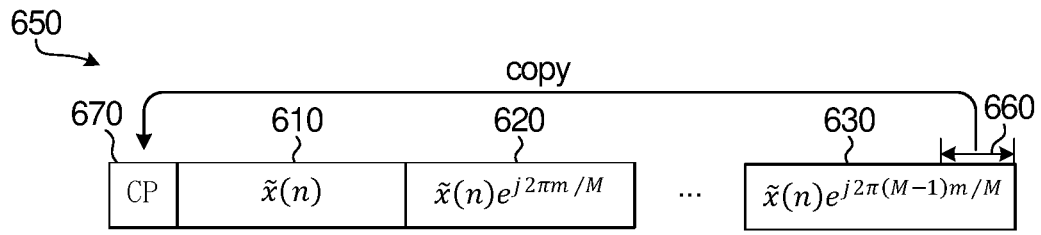
FIG. 6B is a schematic diagram of a RS symbol for which a cyclic prefix has been obtained from the last portion of the RS symbol and added to the beginning of the RS symbol according to an embodiment of the present disclosure.

FIG. 6B illustrates how an end segment 660 of the $M^{th}$ portion 630 can be copied and placed at the beginning of the time domain sequence as a cyclic prefix (CP) 670 to form a time domain reference signal data symbol 650. This time domain reference signal data symbol 650 is transmitted over the channel. At the receiver, after removing the CP, the channel estimation can be determined at the offset locations. However, it is undesirable to transmit a long sequence. A shortened version of the time domain reference signal data symbol 650 can be transmitted, as will be described with reference to FIG. 6C.

Figure 6C:
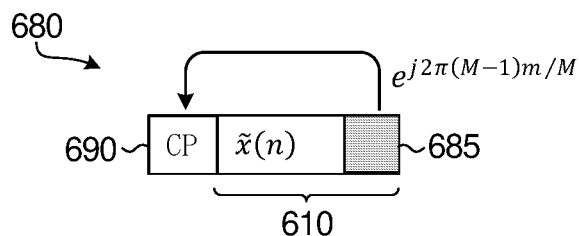
FIG. 6C is a schematic diagram of a short RS symbol for which a cyclic prefix has been obtained from the short RS symbol, multiplied by a weighting factor and then added to the beginning of the short RS symbol according to an embodiment of the present disclosure.

FIG. 6C illustrates how $\tilde{x}(n)$ 610 (from equation 1 above) can be generated together with an appropriate CP 690 to be a RS symbol of short length 680 for transmission by the transmitter. The copied end segment 685 of $\tilde{x}(n)$ 610 is multiplied by a weighting factor $e^{j2\pi(M-1)m/M}$, which corresponds to the weighting factor of the $M^{th}$ portion 630 in FIG. 6A, to create the CP 690.

The method described above that may be used at the transmitter to generate the short RS symbol is for generating a single RS symbol. For a time and frequency resource block that includes multiple RS symbols, some of which are on the established RS sub-carriers and some of which are offset from the established RS sub-carriers, the above described method may be used for each of the multiple RS symbols.

Figure 7:
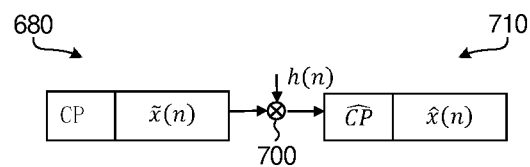
FIG. 7 is a schematic diagram of a short RS symbol transmitted from a transmitter convolved with a channel response between the transmitter and a receiver according to an embodiment of the present disclosure.

FIG. 7 illustrates a mathematical representation of the transmitted RS symbol 680 being convolved 700 with the channel h(n) resulting in a mathematical representation of the RS symbol 710 as observed at a receiver.

Figure 8:
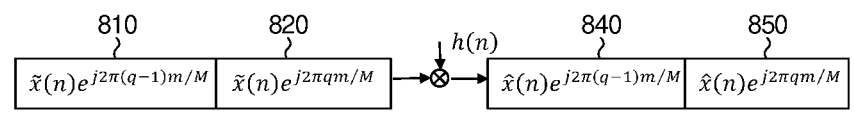
FIG. 8 is a schematic diagram of a two short RS symbols, each multiplied by different weighting factors, that are transmitted from the transmitter and which are convolved with a channel response according to an embodiment of the present disclosure.

FIG. 8 illustrates a mathematical representation of two RS symbols 810 and 820 being convolved 830 with the channel h(n) resulting in a mathematical representation of the two RS symbols 840 and 850 as observed at the receiver. The weighting factors of the two received RS symbols 840 and 850 are the same as their respective values of RS symbols 810 and 820 at the transmitter, which means the channel does not affect the weighting factor value. Therefore, the RS symbol of short length 680, when considered at the receiver, which is RS symbol 710, can be processed at the receiver to substantially reconstruct the original time domain sequence 600 as seen in FIG. 6A.

Figure 9:
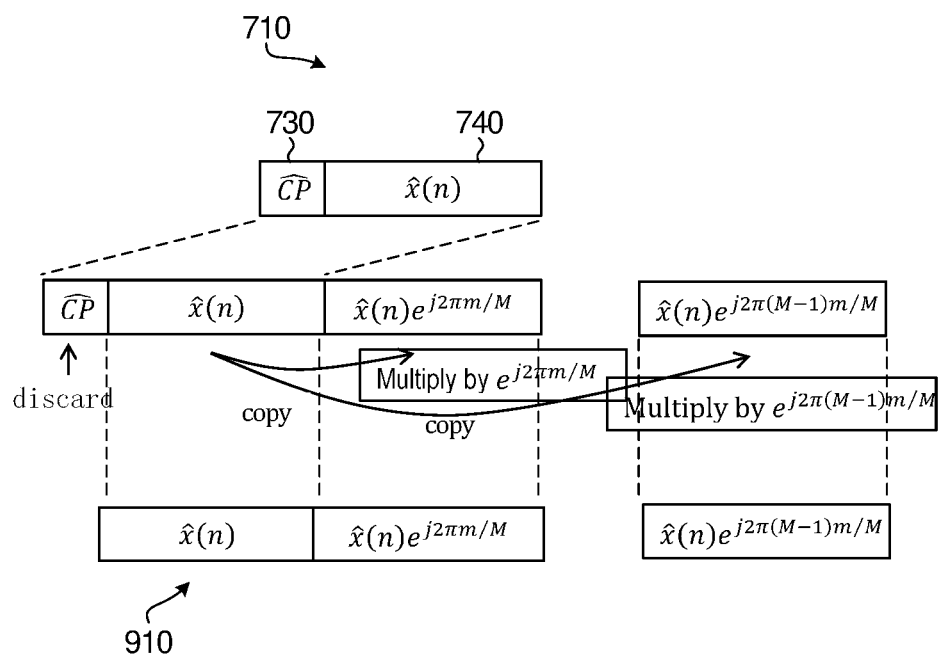
FIG. 9 is a schematic diagram illustrating how a received short RS symbol can be reconstructed with multiple different weighting factors to form a RS symbol having RS symbol locations offset from the established RS sub-carriers according to an embodiment of the present disclosure.

FIG. 9 illustrates how the received RS symbol 710, can be processed by the receiver to substantially reconstruct the original time domain sequence 600. By removing the CP 730 of the RS symbol 710, leaving just $\hat{x}(n)$ 740, and then copying $\hat{x}(n)$ 740 M−1 times and multiplying each of the M−1 copies by a respective weighting value of $e^{j2\pi km/M}$, k=1 to M−1, the original time domain sequence 910 is substantially reconstructed. The length of the combined M RS symbols is equal in length to a data symbol.

By performing a discrete Fourier transform (DFT) on the reconstructed time domain sequence 910, it is possible to obtain the received RS elements at the frequency locations of k'=m, M+m, ..., $(N_p-1)M+m$, which are offset from the established RS sub-carrier locations. In some embodiments, the DFT is an $N_{FFT}$ point DFT, which is the same length $N_{FFT}$ point DFT used on data symbols because the M RS symbols is equal in length to a data symbol. The received RS elements at the frequency locations of k'=m, M+m, ..., $(N_p-1)M+m$ can be used to estimate the channel at those frequency locations of the time frequency resource.

In some embodiments, the CP can be removed from the received RS symbol 710 and using $\hat{x}(n)$ 740 a new series can be generated that is expressed as $\overline{\overline{x}}(n)=\hat{x}(n)e^{-j2\pi mnd_p/MN_{FFT}}$. As compared to the method described in FIG. 9 in which the combined M RS symbols are equal in length to a data symbol, when only a single RS symbol, multiplied by an exponential weight function is considered, the single RS symbol is only 1/M the length of a data symbol. Therefore, a DFT that is an $N_{FFT}/d_p$ point DFT, which is $1/d_p$ or 1/M the length of the $N_{FFT}$ point DFT used on data symbols. When the DFT is performed on the newly generated series, the received RS elements can be obtained for the locations of k'=m, M+m, ..., $(N_p-1)M+m$. The frequency locations of k'=m, M+m, ..., $(N_p-1)M+m$ can then be used to estimate the channel at those frequency locations of the time frequency resource.

Using a $N_{FFT}$ point DFT in the scenario of the replicated M RS symbols may be convenient as it allows a common sized DFT to be used when processing both the reference signal symbols and data symbols. However, performing a longer $N_{FFT}$ point DFT is more complex and computationally intensive. Using a $N_{FFT}/d_p$ point DFT in the scenario of the single RS symbol may be convenient as it is less complex and less computationally intensive. However, using DFTs of two different lengths may introduce some level of complexity.

The description above for the two different embodiments that may be used at the receiver to obtain the received RS elements at the locations of k'=m, M+m, ..., $(N_p-1)M+m$ are for a single RS symbol. In a time and frequency resource block that includes multiple RS symbols, some of which are on the established sub-carriers and some of which are offset from the established sub-carriers, either of the two embodiments may be used for each of the multiple RS symbols.

Figure 10:
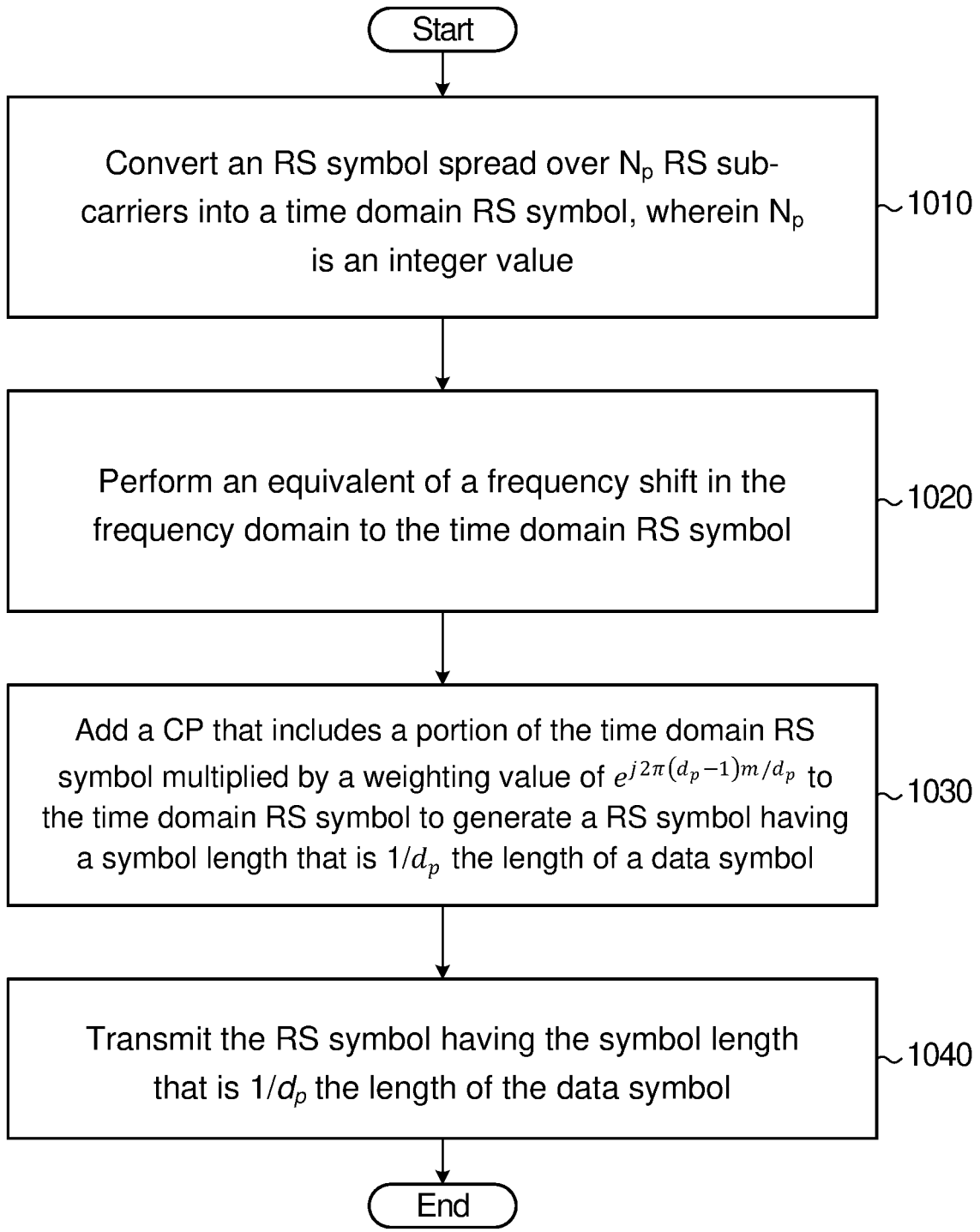
FIG. 10 is a flow charting describing a method performed by a transmitter to generate RS symbol elements that are offset from an established RS sub-carrier location according to an embodiment of the present disclosure.

FIG. 10 is a flow diagram illustrating a method 1000 that may be performed at a transmitter. The method can be applied to a reference signal (RS) symbol having a symbol length that is $1/d_p$ the length of a data symbol or otherwise stated for a RS mapped to a set of sub-carriers of a RS symbol where a sub-carrier spacing of the RS symbol is $d_p$ times that of a sub-carrier spacing of a data symbol, wherein $d_p$, wherein $d_p$ is an integer value. Step 1010 involves converting an RS symbol spread over $N_p$ RS sub-carriers into a time domain RS symbol, wherein $N_p$ is an integer value. In some embodiments, converting the RS symbol may involve performing a $N_{FFT}/d_p$-point IDFT on the RS symbol sequence X(k) to generate a time domain RS symbol sequence x(n), where $N_{FFT}$ is a size of a FFT performed by the transmitter on the data symbol. Step 1020 involves performing an equivalent of a frequency shift in the frequency domain to the time domain RS symbol. In some embodiments, performing the equivalent of the frequency shift involves performing a $m/d_p$ sub-carrier shift in the time domain based by multiplying the time domain RS sequence x(n) by a weighting factor to obtain $\tilde{x}(n)$. The weighting factor may be, for example, $e^{j2\pi mnd/N_{FFT}}$, n=0 to $N_{FFT}/d_p-1$, that results in an offset in the time domain. Step 1030 involves adding a cyclic prefix (CP) that includes a portion of the time domain RS symbol multiplied by a weighting value of $e^{j2\pi(d_p-1)m/d_p}$ to the time domain RS to generate a RS symbol having a symbol length that is $1/d_p$ the length of a data symbol, wherein $d_p$ is equal to a number of data sub-carriers between RS symbol sub-carriers and m is a number of sub-carriers of the frequency shift, which is less than $d_p$. Step 1040 involves transmitting the RS symbol having the symbol length that is $1/d_p$ the length of the data symbol.

Figure 11:
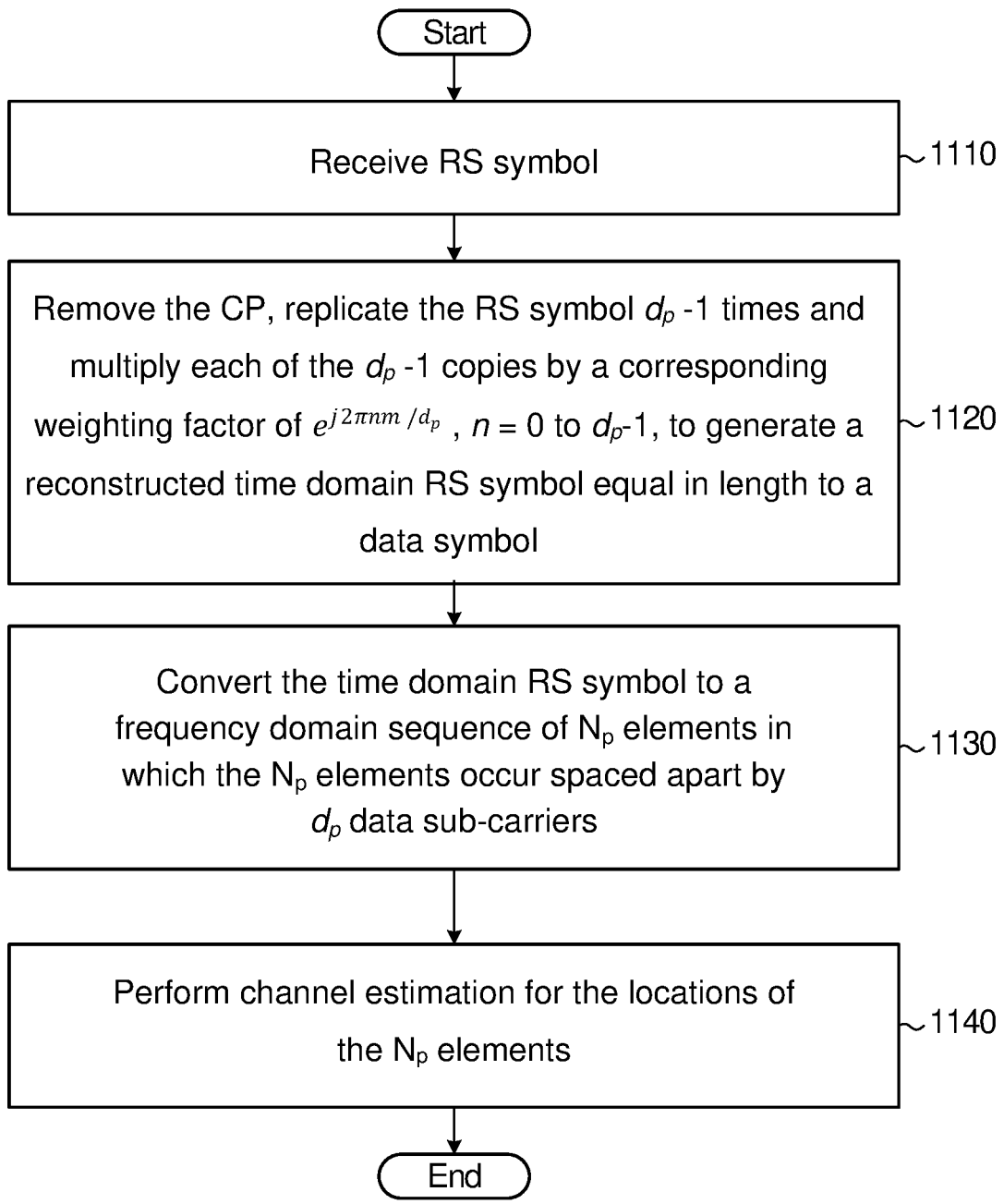
FIG. 11 is a flow charting describing a method performed by a receiver to receive and reconstruct RS symbol elements that are offset from an established RS sub-carrier location according to an embodiment of the present disclosure.

FIG. 11 is a flow diagram illustrating a method 1100 that may be performed at a receiver. At step 1110, a RS symbol is received at the receiver, the RS symbol having a symbol length that is $1/d_p$ the length of a data symbol, wherein $d_p$ is an integer value. Step 1120 involves removing the CP of the received RS symbol, replicating the RS symbol $d_p-1$ times and multiplying each of the $d_p-1$ copies by a corresponding weighting value of $e^{j2\pi nm/d_p}$, n=0 to $d_p-1$ to generate a time domain RS symbol that is equal in length to a data symbol, where $d_p$ is equal to a number of data sub-carriers between RS elements and m is less than $d_p$. Step 1130 involves converting the time domain RS symbol to a frequency domain sequence of $N_p$ elements in which the $N_p$ elements occur spaced apart by $d_p$ data sub-carriers. In some embodiments, the converting the time domain RS symbol to a frequency domain sequence involves performing a $N_{FFT}$-point DFT on the time domain RS sequence. Step 1140 involves performing channel estimation for the location of the $N_p$ elements, which include k'=m, M+m, ..., $(N_p-1)$M+m, wherein M is equal to $d_p$.

Figure 12:
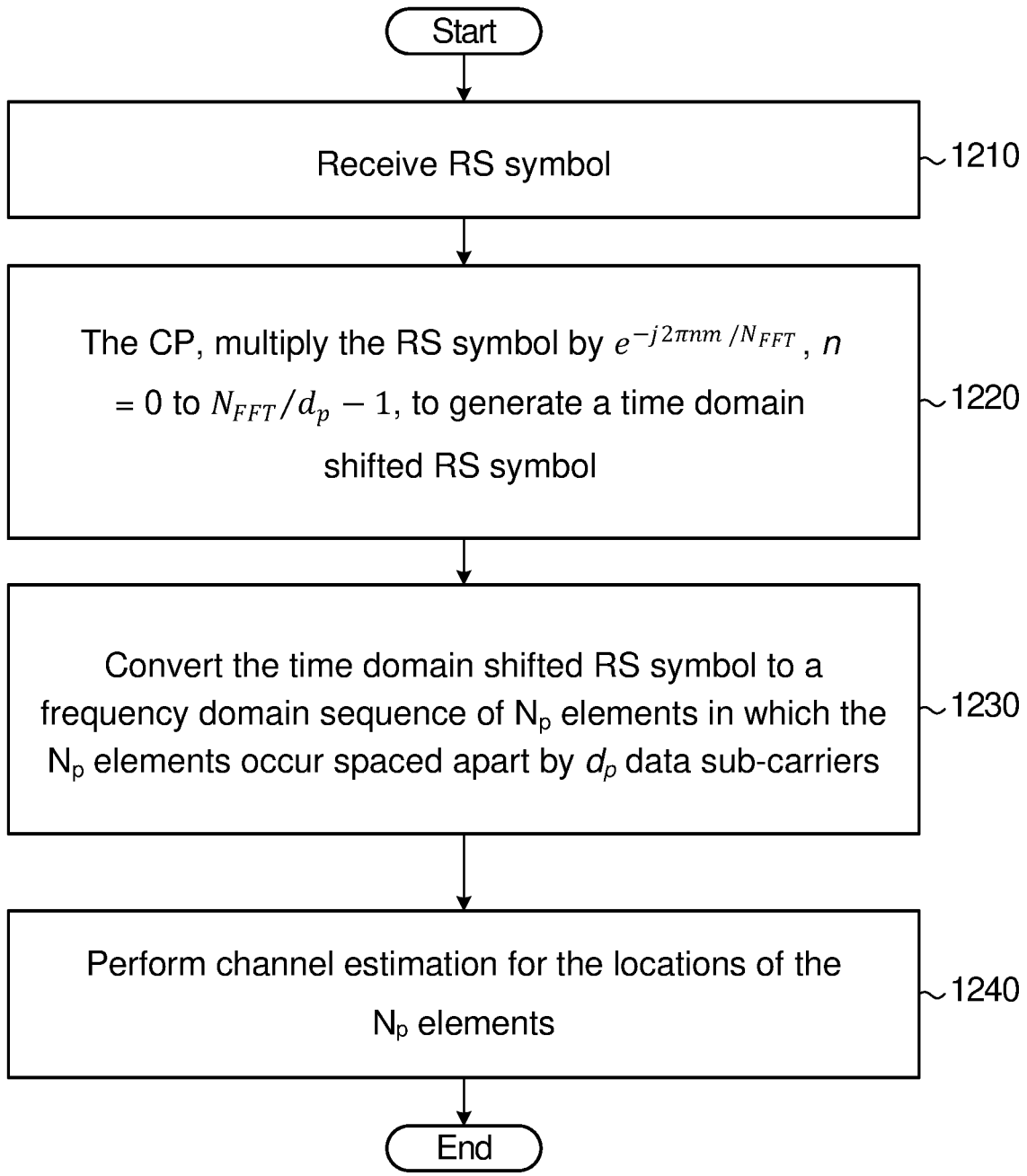
FIG. 12 is a flow charting describing another method performed by a receiver to receive and reconstruct RS symbol elements that are offset from an established RS sub-carrier location according to an embodiment of the present disclosure.

FIG. 12 is a flow diagram illustrating another method 1200 that may be performed at a receiver. At step 1210, a RS symbol is received at the receiver, the RS symbol having a symbol length that is $1/d_p$ the length of a data symbol, wherein $d_p$ is an integer value. Step 1220 involves removing the CP of the received RS symbol, multiplying the RS symbol by $e^{j2\pi nm/N_{FFT}}$, n=0 to $N_{FFT}/d_p-1$, to generate a time domain shifted RS symbol, where $d_p$ is equal to a number of data sub-carriers between RS symbol elements, m is a number less than M, and $N_{FFT}$ is the number of points in a fast Fourier transform (FFT) performed on the data symbol. Step 1330 involves converting the time domain shifted RS symbol to a frequency domain sequence of $N_p$ elements in which the $N_p$ elements occur spaced apart by $d_p$ data sub-carriers. In some embodiments, the converting the time domain shifted RS symbol to a frequency domain sequence involves performing an $N_{FFT}/d_p$-point DFT on the time domain shifted symbol sequence. Step 1240 involves performing channel estimation for the location of the $N_p$ elements, which include k'=m, M+m, ..., $(N_p-1)M+m$, wherein M is equal to $d_p$.

FIG. 10 is from the perspective of a transmitter. The transmitter may be a base station in the case of a DL transmission. The transmitter may be a UE in the case of an UL transmission or SL transmission. FIG. 11 is from the perspective of a receiver. The receiver may be a base station in the case of a UL transmission. The receiver may be a UE in the case of an DL transmission or SL transmission.

When the BS is the transmitter, the configuration is known by the BS and the BS needs to provide the configuration information to the receiver (UE) so the UE knows when where to expect the RS.

When the UE is the transmitter, the configuration is known by the BS (provided by the network) and the BS/network needs to provide the configuration information to the transmitter (UE) so the UE knows when/where to transmit the RS for the BS (DL) or UE (SL).

Information that may be used for RS configuration includes sub-carrier spacing of the RS symbol; CP length; RS symbol density in time domain, a number of antenna ports sharing the same RS symbol, and RS patterns in frequency domain. The sub-carrier spacing of the RS symbol may be expressed in terms of the number of data sub-carriers between RS sub-carriers. RS symbol density may describe how many RS symbols are sent during an assigned time duration and PR symbol locations. In some embodiments, the RS pattern for different antenna ports may be different. When two antenna ports share the same RS symbol, the RS symbols can be frequency division multiplexed (FDM) or code divisional multiplexed (CDM). Therefore, in some embodiments, the number of antenna ports that share the same RS symbol may be signaled. The method of sharing, i.e. FDM or CDM, may be predefined. RS patterns in the frequency domain may include information such as, but not limited to the 'm' value associated with each RS symbol, a number of antenna ports sharing the same RS symbol, and sub-carrier spacing of each RS symbol. In some embodiments, multiple RS patterns can be predefined, and the transmitter indicates a specific RS pattern to be used in the configuration information. For example there may be a set of different patterns that are each identified by a respective index and the transmitter can indicate the pattern index in the configuration information.

In some embodiments, the RS pattern may have a same or frequency density or time domain density, or combination thereof, for all RS symbols and all antenna ports. In some embodiments, the frequency domain RS location, i.e. an amount of virtual shift of the RS sub-carrier is RS symbol index dependent.

In some embodiments, sub-carrier spacing and frequency domain density can be different for different RS symbols.

In some embodiments, different antenna ports may receive RS symbols with a different frequency domain density or a different time domain pilot density.

When RS configuration information is provided to the UE, the RS configuration information is sent using RRC signaling or DCI signaling. In some embodiments, the RS configuration information is signaled to the UE only using RRC. In some embodiments, the RS configuration information is signaled to the UE only using DCI. In some embodiments, some of the RS configuration information is signaled to the UE by using RRC and some of the RS configuration information is signaled to the UE using DCI. In some embodiments, DCI can be used to overwrite the parameters indicated by RRC signaling. DCI can be UE specific, broadcast, or groupcast. DCI can be used to update the RS configuration information by overwriting one or more parameters of the RS configuration information indicated in RRC signaling. The DCI can be sent in a assigned sub-band (or bandwidth part (BWP)). Different sub-bands (or BWP) can have different RS configurations. In some embodiments, filtering or windowing or other spectrum localization methods can be applied to mitigate inter-sub-band interference.

An alternative to step 1120 involves discarding the CP, forming a new series $\bar{x}(n)=\hat{x}(n)e^{j2\pi mmd_p/mN_{FFT}}$ and then step 1130 involves performing a $N_{FFT}/d_p$-point DFT on the new series.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/ modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
    for a reference signal (RS) mapped to a set of sub-carriers of a RS symbol, wherein a sub-carrier spacing of the RS symbol is $d_p$ times that of a sub-carrier spacing of a data symbol, wherein $d_p$ is an integer value,
    converting the RS symbol spread over $N_p$ RS sub-carriers into a time domain RS symbol, wherein $N_p$ is an integer value;
    performing an equivalent of a frequency shift in the frequency domain to the time domain RS symbol; and
    adding a cyclic prefix (CP) comprising a portion of the time domain RS symbol multiplied by a weighting value of $e^{j2\pi(d_p-1)m/d_p}$ to the time domain RS symbol to generate a RS symbol having a symbol length that is 1/M the length of a data symbol, wherein $d_p$ is equal to a number of data sub-carriers between RS symbol sub-carriers, and m is a number of sub-carriers of the frequency shift, which is less than $d_p$; and
    transmitting the RS symbol having the symbol length that is $1/d_p$ the length of the data symbol.

2. The method of claim 1, wherein the converting the RS symbol spread over $N_p$ RS sub-carriers into the time domain RS symbol comprises performing an $N_{FFT}/d_p$ point inverse discrete Fourier transform (IDFT) on the RS symbol to generate the time domain RS symbol, where $N_{FFT}$ is an integer number of points in a Fast Fourier transform being performed on the data symbol.

3. The method of claim 1, wherein the performing the equivalent of the frequency shift in the frequency domain to the time domain RS symbol comprises multiplying the time domain RS symbol by $e^{j2\pi nm/N_{FFT}}$, n=0 to $N_{FFT}/d_p-1$, where $N_{FFT}$ is an integer number of points in a Fast Fourier transform performed on the data symbol.

4. The method of claim 1 further comprising transmitting configuration information that comprises one or more of:
    sub-carrier spacing of the RS symbol;
    CP length;
    a number of antenna ports sharing a same RS symbol;
    RS symbol pattern information comprising:
        for at least one symbol, the value of m; and
        a repetition pattern of symbols.

5. The method of claim 4, wherein the configuration information is transmitted in at least one of the following:

radio resource control (RRC) messaging;
downlink control information (DCI);
uplink control information (UCI); or
sidelink control information (SCI).

6. The method of claim 1, wherein the method is performed by:
a base station for downlink (DL) communication;
a base station for backhaul communication;
a user equipment for uplink (UL) communication; or
a user equipment for sidelink (SL) communication.

7. An apparatus comprising:
a processor coupled with a computer-readable medium having stored thereon, computer executable instructions, that when executed by the processor cause the apparatus to:
for a reference signal (RS) mapped to a set of sub-carriers of a RS symbol, wherein a sub-carrier spacing of the RS symbol is $1/d_p$ times that of a sub-carrier spacing of a data symbol, wherein $d_p$ is an integer value,
convert the RS symbol spread over $N_p$ RS sub-carriers into a time domain RS symbol, wherein $N_p$ is an integer value;
perform an equivalent of a frequency shift in the frequency domain to the time domain RS symbol; and
add a cyclic prefix (CP) comprising a portion of the time domain RS symbol multiplied by a weighting value of $e^{j2\pi(d_p-1)m/d_p}$ to the time domain RS symbol to generate a RS symbol having a symbol length that is $1/d_p$ the length of a data symbol, wherein $d_p$ is equal to a number of data sub-carriers between RS symbol sub-carriers, and m is a number of sub-carriers of the frequency shift, which is less than $d_p$; and
transmit the RS symbol having the symbol length that is $1/d_p$ the length of the data symbol.

8. The apparatus of claim 7, wherein the computer executable instructions that convert the RS symbol spread over $N_p$ RS sub-carriers into the time domain RS symbol comprise computer executable instructions, that when executed by the processor, cause the apparatus to perform an $N_{FFT}/d_p$ point IDFT on the RS symbol sequence of $N_p$ elements to generate the time domain of the RS symbol, where $N_{FFT}$ is an integer number of points in a Fast Fourier transform being performed on the data symbol.

9. The apparatus of claim 7, wherein the computer executable instructions that perform the equivalent of a frequency shift in the frequency domain to the time domain RS symbol comprise computer executable instructions, that when executed by the processor, cause the apparatus to multiply the time domain RS symbol by $e^{j2\pi nm/N_{FFT}}$, n=0 to $N_{FFT}/d_p-1$, where $N_{FFT}$ is an integer number of points in a Fast Fourier transform performed on the data symbol.

10. The apparatus of claim 7, wherein the computer executable instructions, when executed by the processor, cause the apparatus to transmit configuration information that comprise one or more of:
sub-carrier spacing of the RS symbol;
a number of antenna ports sharing a same RS symbol;
CP length;
RS symbol pattern information comprising:
for at least one symbol, the value of m; and
a repetition pattern of symbols.

11. The apparatus of claim 7, wherein the apparatus is:
a base station for downlink (DL) communication;
a base station for backhaul communication;
a user equipment for uplink (UL) communication; or
a user equipment for sidelink (SL) communication.

12. An apparatus comprising:
at least one processor coupled with a non-transitory computer-readable medium having stored thereon, computer executable instructions, that when executed by the at least one processor, cause the apparatus to perform a method including:
receiving a reference signal (RS) symbol having a symbol length that is $1/d_p$ the length of a data symbol, wherein $d_p$ is an integer value;
removing a cyclic prefix (CP) from the received RS symbol;
without the CP, multiplying the RS symbol by $e^{j2\pi nm/N_{FFT}}$, n=0 to $N_{FFT}/d_p-1$, to generate a time domain shifted RS symbol, where $d_p$ is equal to a number of data sub-carriers between RS symbol elements on the RS sub-carrier grid, m is a number less than $d_p$, and $N_{FFT}$ is the number of points in a fast Fourier transform (FFT) performed on the data symbol;
converting the time domain shifted RS symbol to a frequency domain sequence of $N_p$ elements in which the $N_p$ elements occur spaced apart by $d_p$ data sub-carriers; and
performing channel estimation for the location of the $N_p$ elements.

13. The apparatus of claim 12, wherein converting the time domain shifted RS to the frequency domain sequence of $N_p$ elements comprises performing an $N_{FFT}/d_p$ point DFT on the time domain shift RS symbol to generate the frequency domain sequence of $N_p$ elements.

14. The apparatus of claim 12 further comprising receiving configuration information that comprises one or more of:
sub-carrier spacing of the RS symbol;
CP length;
a number of antenna ports sharing a same RS symbol;
RS symbol pattern information comprising:
for at least one symbol, the value of m; and
a repetition pattern of symbols.

15. The apparatus of claim 12, wherein the method of performed by:
a base station for uplink (UL) communication;
a base station for backhaul communication;
a user equipment for downlink (DL) communication; or
a user equipment for sidelink (SL) communication.

16. The apparatus of claim 14 wherein the configuration information is received in at least one of the following:
radio resource control (RRC) messaging;
downlink control information (DCI);
uplink control information (UCI); or
sidelink control information (SCI).

* * * * *